(12) United States Patent
Takaoki

(10) Patent No.: US 10,675,767 B2
(45) Date of Patent: Jun. 9, 2020

(54) ROBOT SYSTEM AND ROBOT CONTROLLER

(71) Applicant: FANUC CORPORATION, Yamanashi (JP)

(72) Inventor: Hidesato Takaoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 133 days.

(21) Appl. No.: 16/047,003

(22) Filed: Jul. 27, 2018

(65) Prior Publication Data

US 2019/0039250 A1 Feb. 7, 2019

(30) Foreign Application Priority Data

Aug. 2, 2017 (JP) ................. 2017-150075

(51) Int. Cl.
*B25J 13/08* (2006.01)
*G05B 19/425* (2006.01)
*B25J 9/16* (2006.01)
*B25J 9/00* (2006.01)

(52) U.S. Cl.
CPC .......... *B25J 13/084* (2013.01); *B25J 9/1664* (2013.01); *B25J 13/081* (2013.01); *G05B 19/425* (2013.01)

(58) Field of Classification Search
CPC ...... B25J 13/084; B25J 13/081; B25J 9/1664; B25J 13/088; B25J 9/1602; B25J 9/0081; B25J 9/0009; G05B 19/425
USPC ................................. 700/245, 264
See application file for complete search history.

(56) References Cited

U.S. PATENT DOCUMENTS

| | | | | |
|---|---|---|---|---|
| 4,879,664 A | * | 11/1989 | Suyama | ........... G06T 7/73 700/186 |
| 6,120,433 A | * | 9/2000 | Mizuno | ........... A61B 34/70 600/102 |
| 6,347,261 B1 | * | 2/2002 | Sakaue | ........... B25J 9/1694 345/156 |
| 6,603,867 B1 | * | 8/2003 | Sugino | ........... G06K 9/00201 340/5.82 |
| 7,983,794 B2 | * | 7/2011 | Kawabe | ........... G01S 17/74 700/225 |

(Continued)

FOREIGN PATENT DOCUMENTS

JP S60-252911 A 12/1985
JP H4-40506 A 2/1992

(Continued)

*Primary Examiner* — Jaime Figueroa
(74) *Attorney, Agent, or Firm* — Hauptman Ham, LLP

(57) ABSTRACT

A robot system and a robot controller, by which a teaching operation, etc., of a robot can be intuitively carried out by a simple operation. The robot has a sensor arranged on a surface of a movable part or the robot, and the sensor is configured to detect a three-dimensional position of an article, when the article contacts or is close to the sensor. When the article reaches a reference position, a mode change section switches a motion mode of the robot to a following mode. In the following mode, based on the direction of movement of the article from the reference position, the direction of motion of the robot is determined. Then, a motion control section controls the motion of each axis of the robot so that a portion where the article contacts moves in a direction generally the same as the direction of movement of the article.

4 Claims, 3 Drawing Sheets

(56) References Cited

U.S. PATENT DOCUMENTS

| | | | | |
|---|---|---|---|---|
| 9,804,593 | B1* | 10/2017 | Davis | G05B 19/423 |
| 9,849,624 | B2* | 12/2017 | Drinic | B29C 63/0095 |
| 2001/0044789 | A1* | 11/2001 | Widrow | G06N 3/061 |
| | | | | 706/14 |
| 2008/0021597 | A1* | 1/2008 | Merte | F16P 3/141 |
| | | | | 700/255 |
| 2015/0081099 | A1* | 3/2015 | Komatsu | B25J 13/085 |
| | | | | 700/258 |
| 2016/0016315 | A1* | 1/2016 | Kuffner, Jr. | B25J 9/1676 |
| | | | | 700/255 |
| 2016/0059412 | A1* | 3/2016 | Oleynik | B25J 9/163 |
| | | | | 700/257 |
| 2016/0067864 | A1* | 3/2016 | Mullan | B25J 9/1605 |
| | | | | 700/19 |
| 2017/0066130 | A1* | 3/2017 | Corkum | B25J 9/1651 |
| 2017/0252002 | A1* | 9/2017 | Mine | A61B 8/4218 |
| 2017/0274536 | A1* | 9/2017 | Takeuchi | B25J 13/085 |
| 2018/0043525 | A1* | 2/2018 | Su | B25J 9/0081 |
| 2018/0043549 | A1* | 2/2018 | Su | B25J 9/12 |
| 2018/0235724 | A1* | 8/2018 | Nowatschin | B25J 19/00 |
| 2018/0243923 | A1* | 8/2018 | Hashimoto | B25J 9/1633 |
| 2018/0289445 | A1* | 10/2018 | Krinninger | A61B 1/00149 |

FOREIGN PATENT DOCUMENTS

| | | |
|---|---|---|
| JP | H9-76183 A | 3/1997 |
| JP | H9-141460 A | 6/1997 |
| JP | H11-231925 A | 8/1999 |
| JP | 2005-231010 A | 9/2005 |
| JP | 2006-123014 A | 5/2006 |
| JP | 2011-7557 A | 1/2011 |
| JP | 2011-502800 A | 1/2011 |
| JP | 2011-209824 A | 10/2011 |
| JP | 2012-81541 A | 4/2012 |
| JP | WO2010/079564 A1 | 6/2012 |
| JP | 2013-71239 A | 4/2013 |
| JP | 2013-86234 A | 5/2013 |
| JP | 2014-142676 A | 8/2014 |
| JP | 2014-182657 A | 9/2014 |
| JP | 2015-520041 | 7/2015 |
| JP | 2015-182142 A | 10/2015 |
| JP | 2015-202537 A | 11/2015 |
| JP | 2016-68236 A | 5/2016 |
| JP | 2016-101774 A | 6/2016 |
| JP | 2017-52031 A | 3/2017 |
| JP | 2017-91224 A | 5/2017 |
| WO | 2015/083266 A1 | 6/2015 |

* cited by examiner

ROBOT SYSTEM AND ROBOT CONTROLLER

RELATED APPLICATIONS

The present application claims priority of Japanese Patent Application No. 2017-150075, filed on Aug. 2, 2017, the disclosure of which is hereby incorporated by reference herein in its entirety.

BACKGROUND OF THE INVENTION

1. Field of the Invention

The preset invention relates to a robot system and a robot controller.

2. Description of the Related Art

As a means for teaching a motion of a robot, a teach pendant configured to be operated by an operator is well-known. As another teaching means, a direct teaching is well-known, in which an operator teaches a motion of a robot by applying a force to the robot so as to move the robot (for example, see JP 2015-202537 A, JP 2013-071239 A, JP H04-040506 A, JP H09-076183 A, and JP H11-231925 A).

The operation by using the teach pendant is skillful, and thus an inexperienced operator needs much time for the teaching. On the other hand, when the direct teaching is used, the operator can intuitively determine the direction of movement of the robot, and thus the operator can teach the robot easier than when using the teach pendant. However, in order to use the direct teaching, it is necessary to attach a dedicated device, such as a teaching handle configured to be gripped or operated by the operator, to the robot (in many cases, to a front end of the robot such as a robot hand). Further, it is burdensome to change an attachment position of the robot where the dedicated device is attached.

SUMMARY OF THE INVENTION

One aspect of the present disclosure is a robot system, comprising: a robot having a movable part; a sensor arranged on a surface of the movable part, the sensor being configured to measure a three-dimensional position of an article when the article contacts or is close to the sensor; a mode change section configured to shift the robot into a following mode when the article reaches a reference position where is on or close to the sensor; and a motion control section configured to, when the three-dimensional position of the article is moved from the reference position, control the robot so that the robot performs a following motion in which the movable part follows the article corresponding to a direction of movement of the article.

Another aspect of the present disclosure is a robot controller of a robot, the robot comprising a movable part and a sensor arranged on a surface of the movable part, the sensor being configured to measure a three-dimensional position of an article when the article contacts or is close to the sensor, the robot controller comprising: a mode change section configured to shift the robot into a following mode when the article reaches a reference position where is on or close to the sensor; and a motion control section configured to, when the three-dimensional position of the article is moved from the reference position, control the robot so that the robot performs a following motion in which the movable part follows the article corresponding to a direction of movement of the article.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
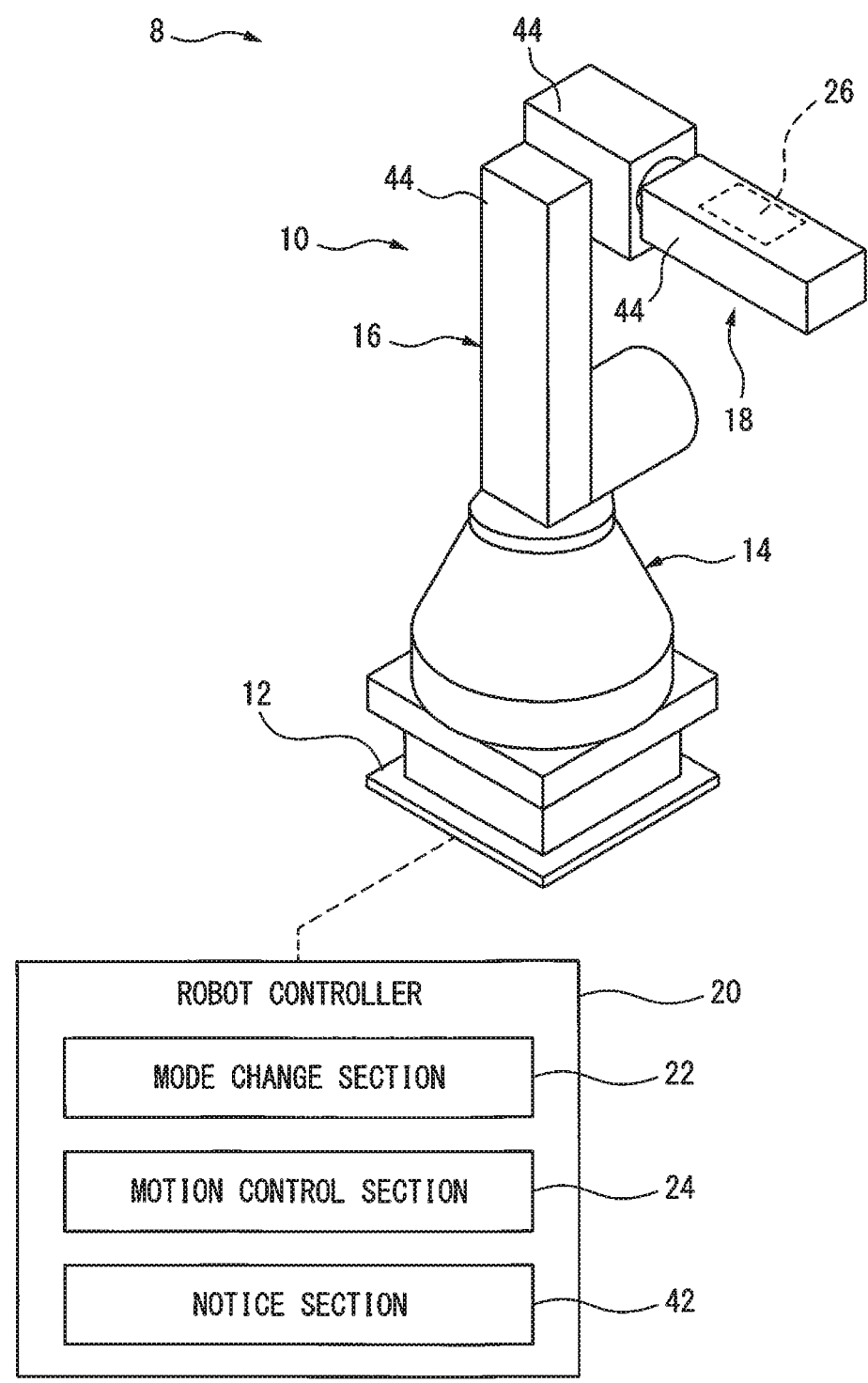
FIG. 1 shows an example of a schematic configuration of a human-collaborative robot and a robot controller according to the present disclosure.

FIG. 1 shows an example of a schematic configuration of a robot system 8 including (a mechanical unit of) a robot 10 and a robot controller 20 according to a preferred embodiment. Various types of robots can be used as robot 10, as long as the robot has a movable part such as a robot arm. In the drawing, robot 10 is a vertical multi-joint robot configured as a human-collaborative (cooperative) robot, which can be operated while sharing a working space with a human. Robot 10 has a base 12, a rotating body 14 arranged on base 12 and rotatable about a generally vertical axis, an upper arm 16 rotatably arranged on rotating body 14, and a forearm 18 rotatably arranged on a front end of upper arm 16.

In robot 10, by rotating the movable part (in this case, at least one of rotating body 14, upper arm 16 and forearm 18), the position of a front end (of forearm 18) can be moved or controlled. Further, by arranging a wrist axis and a hand (not shown) on the front end of forearm 18, the robot can perform various operations such as gripping and conveying a workpiece, etc.

The motion or teaching of robot 10 can be controlled by robot controller 20 connected to robot 10. Robot controller 20 may have a mode change section 22 and a motion control section 24, the functions thereof will be explained below. The (the functions of) mode change section 22 and motion control section 24 may be realized by an arithmetic processing unit (CPU) and a memory, etc., provided to robot controller 20. Alternatively, (the functions of) mode change section 22 and motion control section 24 may be realized by another device (not shown) such as a personal computer or a host computer, which is arranged separately from robot controller 20.

Robot 10 has a sensor 26 arranged on a surface of the movable part (in the drawing, forearm 18), and sensor 26 is configured to detect or measure a three-dimensional position of an article 28 such as a finger of an operator (see FIG. 2), when article 28 contacts or is close to sensor 26. As exemplified in an enlarged view of FIG. 2, sensor 26 is a pressure sensitive sensor including a plurality of pressure sensitive sensor elements 30. Sensor elements 30 are positioned in a row (preferably, in a rectangular pattern as shown), and is configured to measure the three-dimensional position of article 28 while article contacts sensor 26.

Figure 3:
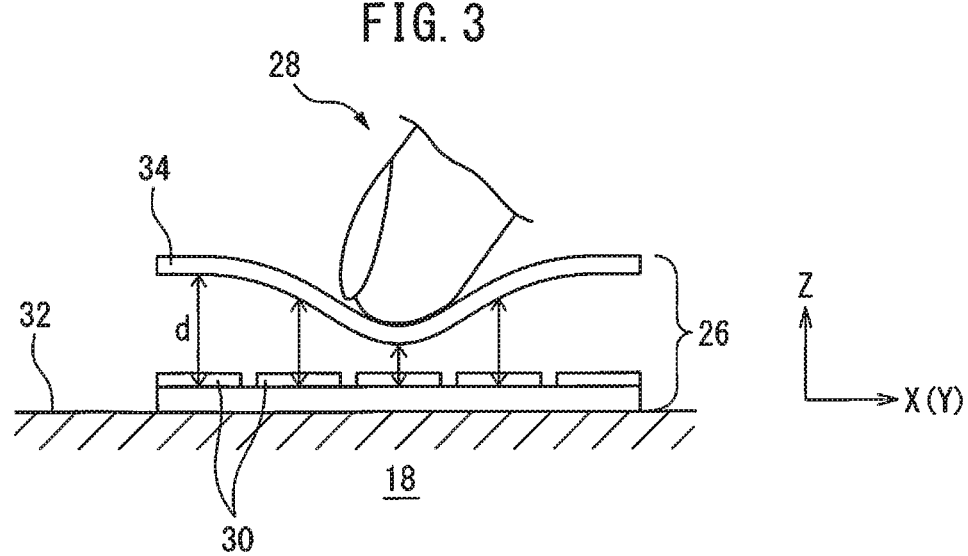
FIG. 3 shows a schematic configuration of a sensor of the robot of FIG. 1.

FIG. 3 shows a state in which the three-dimensional position of article 28 is measured by sensor 26. Sensor 26 has a plurality of pressure sensitive sensor elements 30 positioned in an array at predetermined intervals on surface 32 of the movable part such as forearm 18, and an electrode layer 34 made from metal such as aluminum, configured to cover sensor elements 30 while being spaced from each sensor element by a predetermined distance "d". Hereinafter, electrode layer 34 is explained as a relatively flexible film, whereas a plate-like electrode layer having a higher rigidity than the electrode film may also be used as electrode layer 34.

When article 28 such as a finger of the operator comes into contact with electrode layer 34, electrode film 34 is deformed corresponding to the pressure applied to sensor 26 by finger 28, and then the distance between electrode layer 34 and each sensor element 30 is changed (concretely, the distance becomes shorter than "d" when the finger does not contact the sensor). By detecting the change in the distance by using an electrical resistance or an electrostatic capacitance, sensor 26 can measure the three-dimensional position of finger 28.

Next, the following function of robot 10 obtained by using sensor 26 will be explained, as an example in which robot 10 is taught by using robot controller 20. First, as shown in FIG. 3, the three-dimensional position of article 28 measured when article 28 contacts sensor 26 is stored in a memory, etc., of robot controller 20, as a reference position for shifting robot 10 into a following mode. The reference position nay be arbitrarily determined, for example, when one of sensor elements 30 detects that finger 28 pushes electrode layer 34, it can be judged that finger 28 reaches the reference position. Alternatively, only when a previously specified sensor element 30 detects that finger 28 pushes electrode layer 34, it can be judged that finger 28 reaches the reference position. Alternatively or additionally, when the distance between one sensor element 30 and finger 28 becomes a predetermined ratio, less than one, of (initial) distance "d" in the non-contact state (e.g., two-thirds of d, one half of d, or one third of d), it can be judged that finger 28 reaches the reference position.

Figure 4:
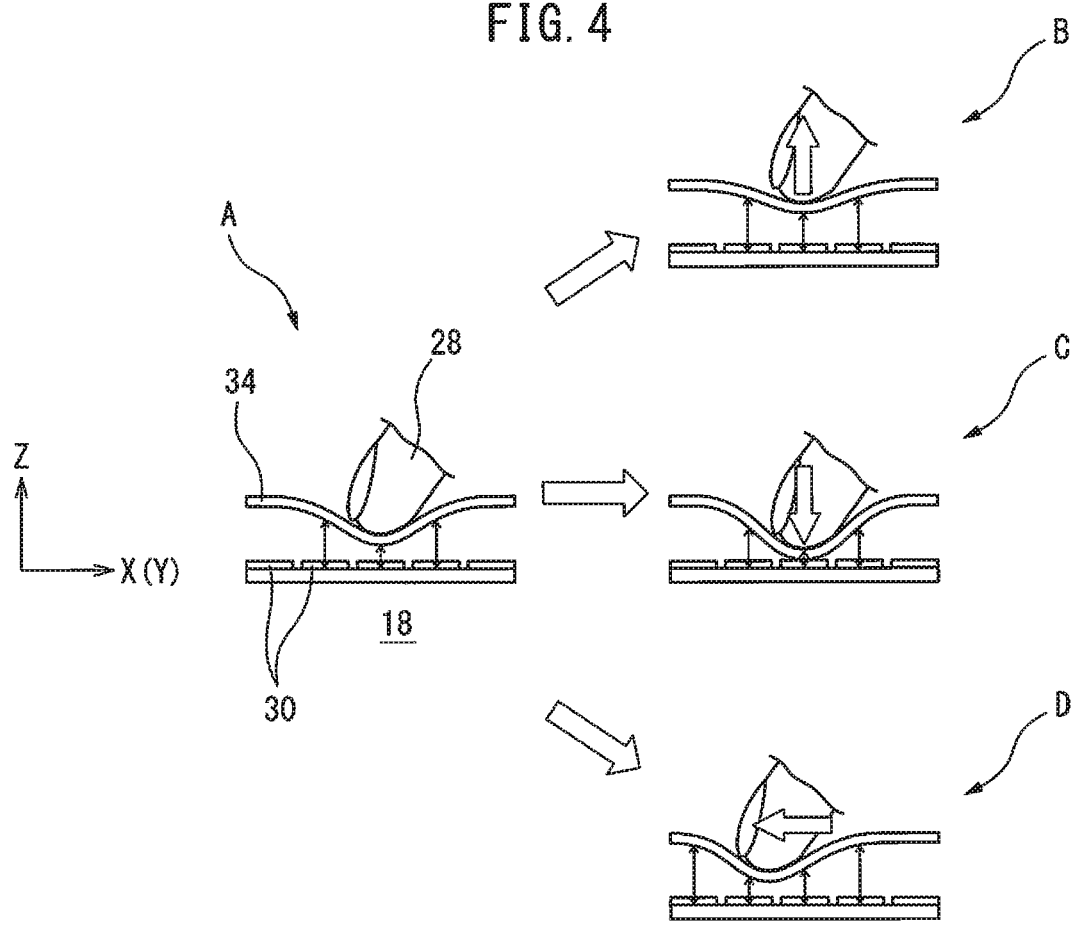
FIG. 4 shows an example of a change in a three-dimensional position of an article relative to the sensor.

Next, when finger 28 reaches the reference position as described above, mode change section 22 switches the motion mode of robot 10 to the following mode. In the following mode, based on the direction of movement of finger 28 from the reference position, (the direction of) motion of robot 10 is determined. For example, the three-dimensional position of finger 28 as shown in a part "A" of FIG. 4 is considered as the reference position. Then, as shown in a part "B," when finger 28 is moved from the reference position in the Z-direction so that the finger is away from forearm 18, motion control section 24 controls the motion of each axis of robot 10 so that the portion (or sensor 26) of forearm 18, where finger 28 contacts, follows the motion of finger 28, in other words, moves in a direction (as indicated by an arrow 36 in FIG. 2) which is generally the same as the direction of movement of finger 28. In this embodiment, the direction of distance "d" between sensor element 30 and electrode layer 34 (i.e., the direction perpendicular to surface 32) is referred to as the Z-direction, and the other two directions, which are perpendicular to the Z-direction and are orthogonal to each other, are referred to as the X-direction and Y-direction.

Similarly, as shown in a part "C," when finger 28 is moved from the reference position in the Z-direction so that the finger pushes down forearm 18, motion control section 24 controls the motion of each axis of robot 10 so that the portion (or sensor 26) of forearm 18, where finger 28 contacts, follows the motion of finger 28, in other words, moves in a direction (as indicated by an arrow 38 in FIG. 2) which is generally the same as the direction of movement of finger 28. Alternatively, as shown in a part "D," when finger 28 is moved from the reference position in the X- or Y-direction so that the finger slides on sensor 26, motion control section 24 also controls the motion of each axis of robot 10 so that the portion (or sensor 26) of forearm 18, where finger 28 contacts, follows the motion of finger 28, in other words, moves a direction (as indicated by an arrow 40 in FIG. 2) which is generally the same as the direction of movement of finger 28.

In addition, the velocity of movement of the movable part of robot 10 may be changed depending on the pressing force of the finger or the velocity of the finger relative to sensor 26. For example, an the case as shown in the part "C" of FIG. 4, when the operator strongly (or quickly) pushes sensor 26 by finger 28, the movable part, of robot 10 can be moved with a high velocity corresponding to the velocity of finger 28. Similarly, in the case as shown in the part "D" of FIG. 4, when the operator quickly) moves his or her finger 28 relative to sensor 26, the movable part of robot 10 can be moved with a high velocity corresponding to the velocity of finger 28.

On the other hand, in case that the following mode (or the teaching operation) should be terminated or switched to the other mode, for example, mode change section 22 may be configured to terminate the following mode or switch the following mode to the other mode, when the operator takes his or her finger off sensor 26 with a velocity higher than a predetermined velocity (e.g., a maximum movement velocity of the robot).

As described above, the operator can determine the direction of movement of robot 10 by the simple operation so that robot 10 moves along the determined direction, and thus the operator can intuitively carry out the teaching operation, etc., of the robot, without using a teach pendant, etc. Generally, the pressure sensitive sensor or a capacitance-type proximity sensor (described below) can precisely detect both the position (or a coordinate value) of the article which contacts or is close to the sensor, and the pressing force (corresponding to the distance between the article and the sensor in the contact/separate direction) by the article. Therefore, the present disclosure utilizes such characteristic of the sensor in order to easily move the moveable part of robot 10 in the desired direction. Further, since sensor 26 is previously provided to robot 10, it is not necessary to attach a dedicated device (e.g., a handle or a guide) to robot 10, in order to teach the robot.

In the illustrated embodiment, sensor 26 is arranged on forearm 18 of robot 10. Alternatively or additionally, the similar sensor may be arranged on the other site of the movable part, such as rotating body 14 and/or upper arm 16. In this regard, motion control section 24 may be configured so that a component of the robot, which is positioned at a front-side (or opposite-side of the base) relative to the portion where sensor 26 is positioned, is not moved (or rotated) in the following mode. For example, when sensor 26 is arranged on upper arm 16, motion control section 24 may control the motion of the robot so that rotating body 14 and upper arm 16 perform the following motion by the operation as shown in FIG. 4, whereas forearm 18 does not rotate relative to upper arm 16. As such, in the present disclosure, it is possible to determine as to whether or not each component of the robot is allowed to move in the following mode, depending on the arrangement position of sensor 26.

Robot controller 20 may have a notice section 42 configured to, when article 28 such as the finger of the operator reaches the reference position (i.e., when robot 10 is shifted into the following mode or robot 10 can perform the following motion), output a notification signal which represents that fact. For example, notice section 42 may have a speaker configured to output a sound when sensor 26 detect that finger 28 reaches the reference position, or a screen configured to display that the motion mode of robot 10 is changed to the following mode, and the speaker or the display may be activated by the notification signal output by notice section 42. In this regard, the speaker or the display may be provided as a device other than controller 20. Further, notice section 42 may be configured to notify the operator that the following mode is terminated, by using the sound or the display on the screen. By virtue of this, the operator can correctly recognize as to whether or not the current motion mode is the following mode, and thus the operator can carry out the teaching operation, etc., with security.

Figure 2:
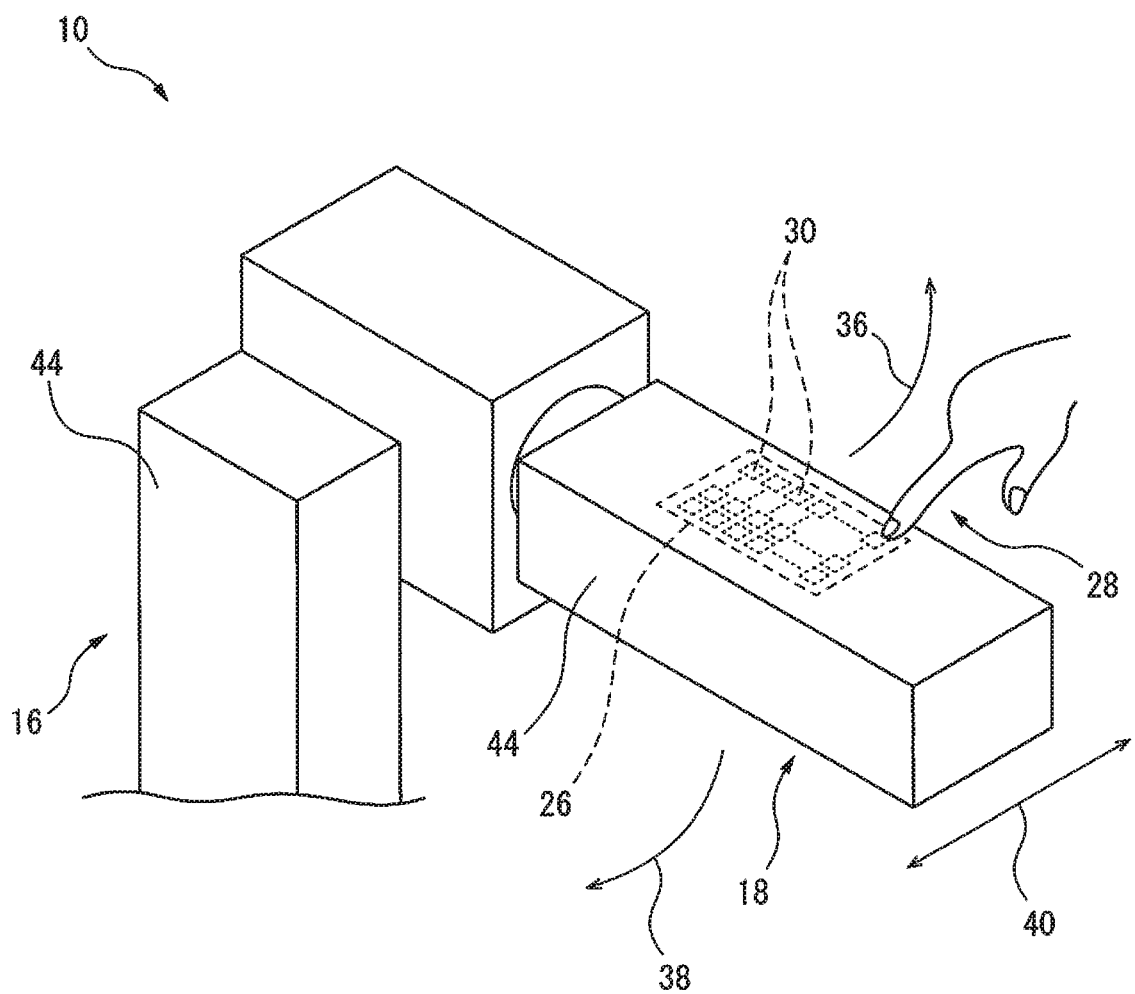
FIG. 2 is an enlarged view of the robot of FIG. 1.

As shown in FIG. 1 or 2, when robot 10 is a human collaborative robot which can be operated while sharing a working space with a human, it is usual that at least a part (preferably, the entirety) of the movable part (in the drawing, upper arm 16 and forearm 18) is covered by a flexible cover member 44, in order to attenuate or absorb the impact generated when robot 10 collides with the human. In the present disclosure, sensor 26 is arranged on the surface of the movable part such as upper arm 16 or forearm 18. In this regard, as an arrangement pattern of sensor 26, the component (e.g., electrode layer 34) of the sensor may be externally exposed so that the article such as finger 28 can directly contact the component. Alternatively, when robot 10 has cover member 44, sensor 26 may be positioned inside cover member 44 (or between cover member 44 and the surface of movable part such as forearm 18) so that the sensor is not externally exposed. In the latter case, the operator indirectly contacts (electrode layer 34 of) sensor 26 via cover member 44, when carrying out the teaching operation, etc. In any case, sensor 26 can detect that article 28 reaches the reference position after contacting or coming close to sensor 26, and can detect in which direction article 28 moves from the reference position (or in which direction the position of article 28 is changed from the reference position).

In the above embodiment, the following motion of robot can be realized by using one finger. However, a plurality of fingers (articles) may be used so as to perform a complicated motion or control. For example, after performing the following motion by using one finger as described above, the following mode may be terminated by simultaneously bringing two fingers in to contact with sensor 26. Further, when robot 10 has a hand, an opening/closing motion of the hand may be performed by moving the two fingers so that the fingers are close to or away from each other, during the fingers contact sensor 26.

In addition, the teach pendant may be provided with an enable switch or a deadman switch, configured to inhibit the teaching operation, etc., unless the operator contacts the switch. In the present disclosure, by setting or configuring a specified pressure sensitive sensor element 30 as the enable switch or the deadman switch, the operator can operate the robot so as to perform the following motion by using one finger, while contacting the enable switch or the deadman switch by the other finger. As such, motion control section 24 can previously associate a predetermined motion other than the following mode with the operation of sensor 26 carried out by simultaneously contacting the fingers with sensor 26 or moving the fingers close to sensor 26, in order to control the robot so that the robot performs the predetermined motion.

Although sensor 26 is the pressure sensitive sensor having plural pressure sensitive sensor elements 30 in the above embodiment, sensor 26 may be a capacitance-type proximity sensor. Concretely, instead of pressure sensitive sensor elements 30, a plurality of capacitance-type sensor elements may be positioned in a row or in a rectangular pattern, similarly to sensor elements 30. The configuration of sensor 26 having the capacitance-type sensor elements may generally correspond to the configuration of FIG. 3 without electrode layer 34. In particular, pressure sensitive sensor elements 30 can detect that the article such as finger 28 comes into contact with electrode layer 34 and can also detect the three-dimensional position of the article during the article contacts the electrode layer. On the other hand, the capacitance-type sensor elements can detect that the article such as finger 28 approaches comes close to the capacitance-type proximity sensor and can also detect the three-dimensional position of the article during the article is close to the sensor. Therefore, also when the capacitance-type proximity sensor is used, similarly to when the pressure sensitive sensor is used, the robot can be shifted into the following mode upon when the article reaches the reference position, and the following motion e.g., the teaching) of the robot can be performed.

In many cases, an industrial robot has a force sensor or a torque sensor configured to detect an external force applied to the robot by a human such as an operator, etc., and the robot is configured to stop the motion thereof for security, when the detected external force exceeds a predetermined threshold. In this regard, sensor 26 of the present disclosure may also have the function of the force sensor or the torque sensor. By virtue of this, a cost of the robot system can be reduced.

According to the present disclosure, the following motion of the movable part of the robot can be performed depending on the three-dimensional position of the article which contacts or is close to the sensor, and thus the motion control such as the teaching for the robot can be intuitively carried out by the simple operation.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot system, comprising:
   a robot having a movable part;
   a sensor arranged on a surface of the movable part, the sensor being configured to measure a three-dimensional position of an article when the article contacts or is close to the sensor;
   a mode change section configured to shift the robot into a following mode when the article reaches a reference position where is on or close to the sensor; and
   a motion control section configured to, when the three-dimensional position of the article is moved from the reference position, control the robot so that the robot performs a following motion in which the movable part follows the article corresponding to a direction of movement of the article,
   wherein the robot has a cover member configured to cover the movable part, and the sensor is positioned inside the cover member.

2. The robot system as set forth in claim 1, wherein the sensor is a pressure sensitive sensor or a capacitance-type proximity sensor.

3. A robot controller of a robot, the robot comprising a movable part and a sensor arranged on a surface of the movable part, the sensor being configured to measure a three-dimensional position of an article when the article contacts or is close to the sensor, the robot controller comprising:

a mode change section configured to shift the robot into a following mode when the article reaches a reference position where is on or close to the sensor; and a motion control section configured to, when the three-dimensional position of the article is moved from the reference position, control the robot so that the robot performs a following motion in which the movable part follows the article corresponding to a direction of movement of the article, wherein the motion control section is configured to control the robot so that a portion of the movable part, which is positioned at a front side relative to a site of the movable part where the sensor is arranged, is not moved in the following mode.

4. The robot controller as set forth in claim 3, further comprising a notice section configured to output a notification signal which represents that the robot is shifted into the following mode by the mode change section.

* * * * *